US007418113B2

(12) United States Patent
Porikli et al.

(10) Patent No.: US 7,418,113 B2
(45) Date of Patent: Aug. 26, 2008

(54) TRACKING OBJECTS IN LOW FRAME RATE VIDEOS

(76) Inventors: Fatih M. Porikli, 32 Whites Ave., Apt #41, Watertown, MA (US) 02472; Oncel Tuzel, 23543 BPO Way, Piscataway, NJ (US) 08854

( * ) Notice: Subject to any disclaimer, the term of this patent is extended or adjusted under 35 U.S.C. 154(b) by 600 days.

(21) Appl. No.: 11/097,400

(22) Filed: Apr. 1, 2005

(65) Prior Publication Data

US 2006/0222205 A1 Oct. 5, 2006

(51) Int. Cl.
*G06K 9/00* (2006.01)
*H04N 7/18* (2006.01)

(52) U.S. Cl. ..................... 382/103; 348/143
(58) Field of Classification Search .............. 382/103; 348/103
See application file for complete search history.

(56) References Cited

OTHER PUBLICATIONS

Medeiros, "Speckle noise MAP filtering based on local adaptive neighborhood statistics". Computer Graphics and Image Processing, 1999. Proceedings. XII Brazilian Symposium on Oct. 17-20, 1999 pp. 347-354.*
Iain E. G. Richardson, H.264 and MPEG-4 Video Compression, 2003, wiley, p. 34, 100-137, 228-233.*
Robert T. Collins, "A System for Video Surveillance and Monitoring", tech. report CMU-RI-TR-00-12, Robotics Institute, Carnegie Mellon University, May 2000, p. 1-5.*
Comaniciu, Real-Time Tracking of Non-Rigid Objects using Mean Shift, 2000, Computer Vision and Pattern Recognition, 2, 142-159.*
Chris Stauffer, Adaptive background mixture models for real-time tracking, 1999, Computer Vision and Pattern Recognition, 2, 246-252.*
R. Collins, "Mean-shift blob tracking through scale space," in Proc. IEEE Conf. on Computer Vision and Pattern Recognition, Madison, WI, 2003, pp. 234-240.
D. Comaniciu and P. Meer, "Mean-shift: A robust approach toward feature space analysis," IEEE Trans. Pattern Anal. Machine Intell., vol. 24, pp. 603-619, 2002.
D. Comaniciu, V. Ramesh, and P. Meer, "Kernel-based object tracking," IEEE Trans. Pattern Anal. Machine Intell., vol. 25, pp. 564-577, 2003.
A. Elgammal, D. Harwood, and L. Davis, "Non-parametric model for background subtraction," in Proc. European Conf. on Computer Vision, Dublin, Ireland, vol. II, 2000, pp. 751-767.
D. Koller, J. Weber, and J. Malik, "Robust multiple car tracking with occlusion reasoning," in Proc. European Conf. on Computer Vision, Stockholm, Sweden, 1994, pp. 189-196.
F. Porikli and O. Tuzel, "Human body tracking by adaptive background models and mean-shift analysis," in Conference on Computer Vision Systems, Workshop on PETS, IEEE, Apr. 2003.

(Continued)

*Primary Examiner*—Jingge Wu
*Assistant Examiner*—Max Shikhman (57) ABSTRACT

A method tracks a moving object in a video acquired of a scene with a camera. A background model is maintained for each frame, and moving objects are detected according to changes in the background model. An object model is maintained for the moving object, and kernels are generated for the moving object. A mean-shift process is applied to each kernel in each frame to determine a likelihood of an estimated location of the moving object in each frame, according to the background models, the object model, and the mean shift kernels to track the moving object in the video.

27 Claims, 2 Drawing Sheets

OTHER PUBLICATIONS

C. Stauffer and E. Grimson, "Adaptive background mixture models for real-time tracking," in Proc. IEEE Conf. on Computer Vision and Pattern Recognition, Fort Collins, CO, vol. II, 1999, pp. 246-252.

K. Toyama, J. Krumm, B. Brumitt, and B.Meyers, "Wallflower: Principles and practice of background maintenance," in Proc. 7th Intl. Conf. on Computer Vision, Kerkyra, Greece, 1999, pp. 255-261.

C. Wren, A. Azarbayejani, T. Darell, and A. Pentland, "Pfinder: Real-time tracking of the human body," IEEE Trans. Pattern Anal. Machine Intell., vol. 19, pp. 780-785, 1997.

T. Zhao and R. Nevatia, "Tracking multiple humans in crowded environment," in Proc. IEEE Conf. on Computer Vision and Pattern Recognition,Washington, DC, vol. II, 2004, pp. 406-413.

Porikli et al. :"Object Tracking in Low-Frame-Rate Video," XP001091446 Jan. 20, 2005.

Maggio et al.: "Hybrid particle filter and Mean shift tracker with adaptive transition model." XP010790616 Mar. 18, 2005.

Wenmiao et al.: "A color histogram based people tracking system." XP010540597 May 6, 2001.

* cited by examiner

TRACKING OBJECTS IN LOW FRAME RATE VIDEOS

FIELD OF THE INVENTION

This invention relates generally to tracking objects in videos, and more particularly to tracking objects in videos acquired at a low frame rate.

BACKGROUND OF THE INVENTION

Many computer vision and video surveillance applications seek to identify moving objects, for example, pedestrians, or vehicles in different environments. Generally, something is interesting in a scene when it is substantially different from a background model of a stationary scene acquired by a camera. The simplest background model assumes that the background scene is truly static over time, and that objects in the scene move at speeds that are consistent with the objects.

Over time, the intensity value of an individual pixel in a static background usually follows a normal distribution. Therefore, the uninteresting variability in the scene can be modeled adequately by a unimodal, zero-mean, 'white', Gaussian noise process. Hence, a reasonable model to represent such a statistical distribution is a single Gaussian model, C. R. Wren, A. Azarbayejani, T. J. Darrell, and A. P. Pentland, "Pfinder: Real-time tracking of the human body," PAMI, 19(7), pp. 780-785, July 1997.

Often, a single Gaussian model is inadequate to accurately model the temporal changes of a pixel intensity value in a dynamic background, such a background with changing shadows due to changes in lighting conditions. Therefore, more complex systems include mechanisms for rejecting lighting changes as uninteresting, such as variability caused by cast shadows, Ismail Haritaoglu, David Harwood, and Larry S. Davis, "W4: Who? When? Where? What?" Proceedings of FG'98, IEEE, April 1998.

The use of multiple models to describe dynamic backgrounds at the pixel level was a breakthrough in background modeling. Specifically, methods employing a mixture of Gaussian distributions have become a popular basis for a large number of related applications in recent years.

A mixture of three Gaussian components can be used to model visual properties of each pixel, N. Friedman and S. Russell, "Image segmentation in video sequences: A probabilistic approach," Thirteenth Conference on Uncertainty in Artificial Intelligence, August 1997. That model also uses an expectation-maximization (EM) process to learn the Gaussian Mixture Model (GMM) over time. In a traffic surveillance application, the intensity value of each pixel is restricted to three hypotheses: road, shadow, and vehicles. Unfortunately, that simple assumption significantly degrades the ability of the GMM to model arbitrary distributions for individual pixels. Moreover, that method is computationally expensive.

Another method allows the scene to be non-static, Chris Stauffer and W. E. L. Grimson, "Adaptive background mixture models for real-time tracking," Computer Vision and Pattern Recognition, volume 2, June 1999. Each pixel is modeled as a mixture of Gaussian distributions with a variable number of Gaussian components. That method represents the background as a multi-modal process, where each mode is a static model plus a zero-mean, white, Gaussian noise process. The models can be updated in real-time using approximations. That video surveillance system has been proven robust for day and night cycles, and for scene changes over long periods of time. However, for backgrounds that exhibit very rapid variations, such as ripples on water, ocean waves, or moving grass and trees, that model can result in a distribution with a large variance over a long video sequence. Thus, the sensitivity for detecting foreground objects is reduced significantly.

A similar competitive multi-modal background process is described by F. Porikli and O. Tuzel, "Human body tracking by adaptive background models and mean-shift analysis," in Conference on Computer Vision Systems, Workshop on PETS, IEEE, April 2003, incorporated herein by reference.

To address such challenging situations, non-parametric techniques have been developed. Those techniques use statistics of the pixel values to estimate background properties at each pixel, based on multiple recently acquired samples. Those techniques can adapt to rapid background changes, Elgammal, D. Harwood, L. S. Davis, "Non-parametric model for background subtraction," ECCV 2000, June 2000. That method uses a Gaussian function for density estimation. The model represents a history of recent sample values over a long video sequence.

Other similar techniques emphasize a variable size kernel for the purpose of adaptive density estimation. A kernel corresponds to a search region in the data space. As another feature, an optical flow can be used, Anurag Mittal, Nikos Paragios, "Motion-based background subtraction using adaptive kernel density estimation," CVPR 2004, Volume 2, pp. 302-309, June, 2004.

Other techniques that deal with effective background modeling can be categorized as predictive methods. Predictive methods treat pixel intensity changes as a time series and use a temporal model to predict a next pixel value, based on past observations. The deviation between the predicted value and the actual observation can be used to adjust the parameters of the predictive model.

Other methods use filters. For example, a Kalman-filter can model the dynamic properties of each pixel, Dieter Koller, Joseph Weber, and Jitendra Malik, "Robust multiple car tracking with occlusion reasoning," ECCV'94, May 1994. A simple version of the Kalman-filter, e.g., the Weiner filter, can make probabilistic predictions based on a recent history of pixel intensity values.

An autoregressive model captures properties of dynamic scenes for the purpose of similar textures simulation, G. Doretto A. Chiuso, S. Soatto, Y. N. Wu, "Dynamic textures," IJCV 51(2), pp. 91-109, 2003. That method was improved to address the modeling of dynamic backgrounds and to perform foreground detection in video surveillance, Antoine Monnet, Anurag Mittal, Nikos Paragios, Visvanathan Ramesh, "Background modeling and subtraction of dynamic scenes," ICCV'03, p. 1305, October, 2003, and Jing Zhong and Stan Sclaroff, "Segmenting foreground objects from a dynamic textured background via a robust Kalman Filter," ICCV'03, pp. 44-50, 2003. Although good results have been obtained for some challenging sample video, the computation cost of using such an autoregressive model is high.

In general, conventional background modeling suffers from two major disadvantages. The computational complexity of those models is inherently high. This is a particular problem in a large scale video surveillance system, where a large number of videos are acquired concurrently, and where it is desired to track objects in the video in real-time. Conventional systems require costly network, storage, and processing resources.

Therefore, it is desired to provide a system and method for concurrently tracking multiple objects in a large number of videos with reduced network, storage, and processing resources.

In addition, conventional methods assume that objects move at a speed that is consistent with the objects, and that the objects to be tracked have a substantial amount of overlap in successive frames. Thus, the conventional methods expect the location of an object in one frame to be substantially co-located with the object in a next frame.

Therefore, it is desired to track objects that move at speeds that are inconsistent with the objects.

SUMMARY OF THE INVENTION

The invention provides a system and method for tracking objects in videos acquired at a low frame rate, for example, one frame per second (1 fps), or less. Acquiring a video at a lower frame rate reduces required resources such as network bandwidth and storage media. However, in a low rate video, objects move at speeds faster than expected, and there rarely is an overlap of the location of the object in successive frames. Hence, conventional object tracking methods cannot be used.

Therefore, the invention uses a mean-shift process that uses multiple kernels centered at regions in a sequence of frames with a substantial motion. The convergence of the mean-shift process is improved by integrating two likelihood terms using object models.

DETAILED DESCRIPTION OF THE PREFERRED EMBODIMENT

System Structure

Figure 1:
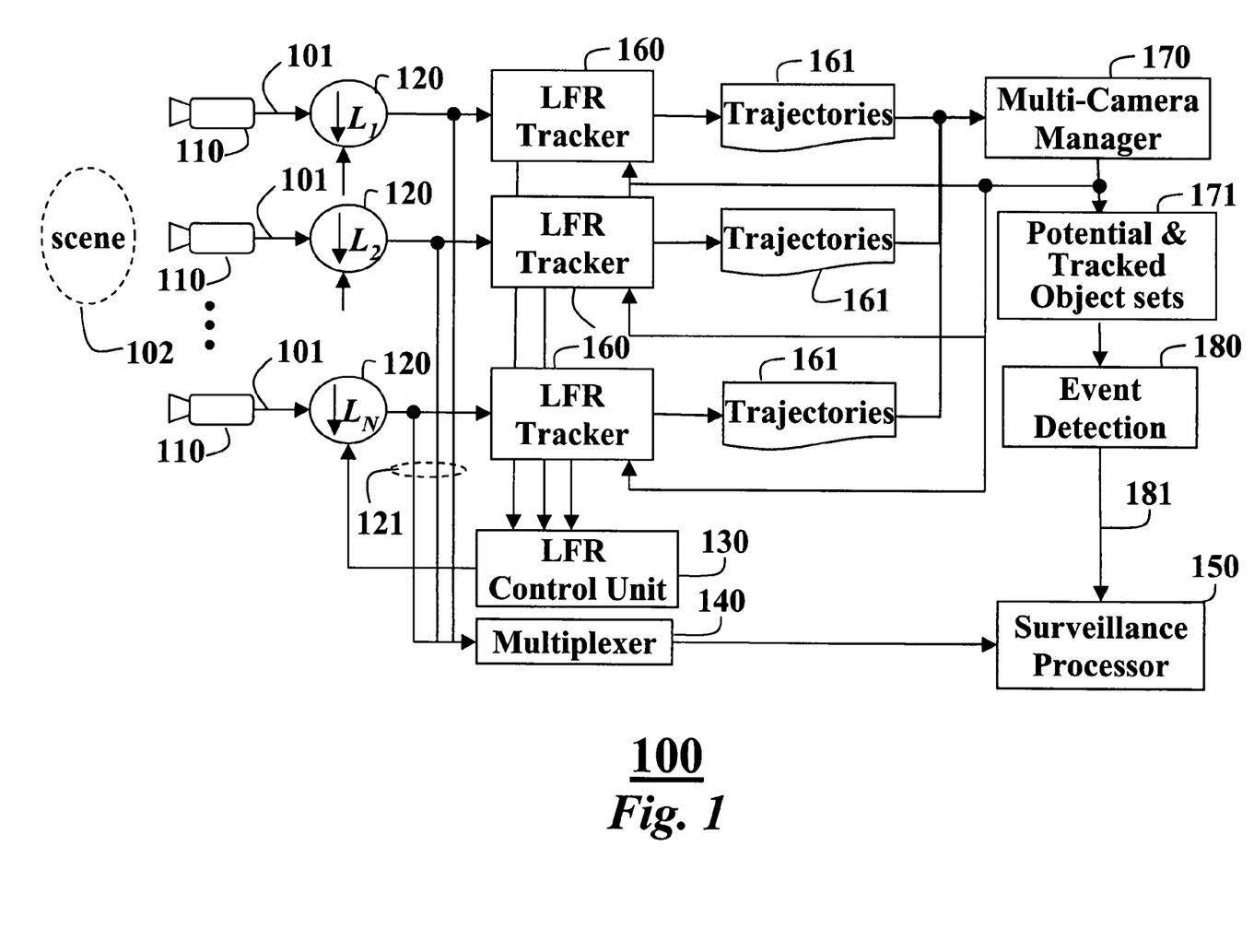
FIG. 1 is a block diagram of a system according to the invention for tracking objects in videos acquired at low frame rates.

As shown in FIG. 1, our invention provides a system and method 100 for tracking objects 171 in a video 101 acquired of a scene 102 by one of a large number of cameras 110, such as in a large scale surveillance system. Conventional cameras are designed to acquire the video at a fixed, relatively high frame rate, e.g., thirty or sixty frames per second (fps).

In order to reduced the number of required resources, and to improve the processing efficiency, our invention sub-samples 120 frames of the videos. Thus, the videos that are communicated, processed and stored are acquired at a low frame rate (LFR), for example, one frame per second (1 fps), or less. A LFR control unit 130 determines the frame rate. The LFR frames 121 are multiplexed 140 and sent to a surveillance processor 150.

LFR trackers 160 determine trajectories 161. The LFR trackers also provide feedback to the LFR control unit 130. The trajectories are fed to a multi-camera manager 170, and objects 171 are detected. The objects are used to detect 180 significant events 181, which are fed to the surveillance processor 150.

Because the videos are acquired at such a low frame, conventional object trackers fail because objects appear to moving much faster than expected, and there rarely is an overlap of moving objects in successive frames, as there would be in videos acquired at normal frame rates, e.g. 30 fps or higher.

Method Operation

Figure 2:
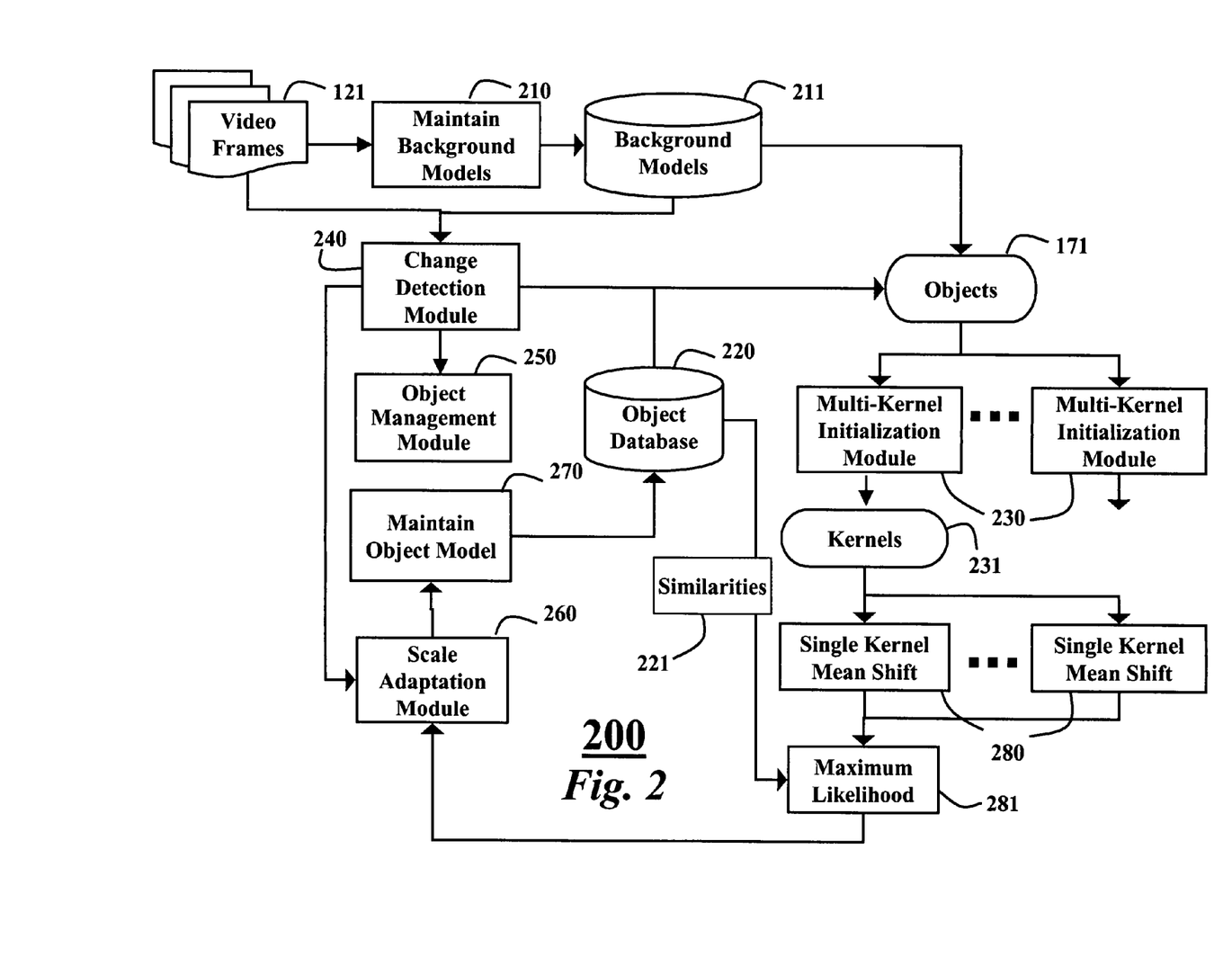
FIG. 2 is a flow diagram of a method according to the invention for tracking objects in videos acquired at low frame rates.

As shown in FIG. 2, our invention uses a multi-modal background modeling method 200. In our method, background models 211 according to observed illumination changes in the sequence of the sub-sampled frames 121 are maintained 210.

Each pixel in each frame is evaluated to determine whether the pixel 'fits' a background model. If the pixel diverges significantly from the background model, then the pixel is assigned to be a foreground pixel, perhaps associated with a moving object.

To detect regions associated with moving objects, we first remove small regions of unconnected pixels or 'speckles' in each frame, perhaps due to noise. Regions of connected pixels are determined from the remaining pixels. Each connected region is associated with a separate object.

We remove speckle noise by morphology. To accelerate the filtering process, we provide an erosion-dilation filter. Because we have a binary foreground-background map, we can transfer thirty-two pixel values into a four-byte integer number. By shifting right and left, and applying logical inclusion operations to the upper and lower rows of bits, we apply morphological dilation. In a second pass, logical exclusion is applied, instead of inclusion similarly, to 'erode' the frame. Thus, our filtering is 32 times faster.

We apply connected component analysis to determine the connected regions of the foreground pixels after filtering. We use a graph-based single-pass process. During the connected component analysis, we extract the connected regions, i.e., pixels that are likely associated with a moving object in the frame. For each connected region, we determine the total number of pixels, the center of mass, the coordinates of an object kernel that encloses all of the pixels of the connected component, and coordinates of an inner kernel that includes 90% of the pixels of the connected component.

Using these two kernels, we can differentiate convex regions from elongated regions. A convex region has a small ratio of the area of the object and inner kernels, whereas an elongated region has a larger ratio. It should be noted that the object and inner kernels are not necessarily co-centric.

The LFR tracker 160 maintains two sets of object 171 in an object database 220, i.e., potential objects and tracked objects. Moving regions of connected pixels that are tracked for less than a predetermined number of frames are marked as potential objects. These pixels may correspond to either noise in the scene 102 or potential objects to be tracked.

If a potential object is tracked for a predetermined number of frames, then the object is removed from the set of potential objects, and inserted into the set of tracked objects.

We use the properties of the connected regions to determine the regions associated with objects. The properties are in the form of kernels 231, as described below. The kernels include object, inner, and outer kernels. If inner kernels of two connected regions overlap, then the regions are associated with the same object. If object kernels overlap and the overlapping area is comparable to the area of the regions, then the outer kernels are also associated with the same object.

Multi-Kernel Mean-Shift

Objects 171 are tracked 160 in the sequence of sub-sampled frames 121 using multi-kernel mean-shift processes. For each object, the kernels 231 are first initialized 230.

A kernel is a region of pixels possibly associated with a moving object. The kernel corresponds to a 2D spatial area in a frame. The kernel can be rectangular, circular, ellipsoid, a set of pixels, an object silhouette, or any other desired shape. We prefer a rectangular kernel. In addition to spatial regions, the kernel can also be associated with a 3D volume in a color space.

The conventional mean-shift process uses clustering. That mean-shift process does not require prior knowledge of the number of clusters, and does not constrain the shape of the clusters, see D. Comaniciu and P. Meer, "Mean-shift: A robust approach toward feature space analysis," *IEEE Trans. Pattern Anal. Machine Intell.*, vol. 24, pp. 603-619, 2002, incorporated herein by reference.

That mean-shift process starts at a data point, and at each iteration moves in a direction of the gradient of pixel intensities. The iterations terminate when the point converges to a local mode of the distribution. Convergence to a local mode of the distribution is guaranteed when the mean-shift iteration starts at the data point. However, the conventional mean-shift tracking requires significant overlap of the kernels of the objects in successive frames.

In the LFR video 121 according to the invention, the movement of the objects is unusually large and unpredictable. Therefore, the conventional single mean-shift kernel centered at a previous location of the object will fail.

To overcome this problem, in addition to the previous location of the object, multiple kernels 231 are initialized 230 for each object 171 at areas in each frame that correspond to a substantial amount of motion in the scene. The multiple kernels are assigned according to an estimated likelihood of a pathway of the moving object, as described below in greater detail. Likelihood 281 scores of the multiple kernels are determined at converged points and a maximum scored location is selected as the new location.

Instead of depending on a single kernel, which is the object region in the previous frame, we iterate mean-shift in multiple kernels centered at areas corresponding to substantial motion as determined by a change detection module 240.

A mean-shift process 280 is applied to each kernel 231 to determine the likelihood 281 that the kernel at the location of the estimated pathway is indeed associated with a moving object.

After estimating the location of each object, we match the connected components. The matching is based on the overlap of the kernels with the pixels of connected components.

Assignment of Multiple Kernels

We estimate a background model using any available method such as Gaussian models or Kalman filtering, and we compare the current frame with the estimated reference background model to find regions in the current frame that are different.

For each pixel, we determine a distance between the color of the pixel in the current frame and the corresponding pixel in the background model to obtain a distance map. Then, we apply spatial clustering to the distance map. This clustering is done by another spatial mean-shift clustering to find peaks of the distance map. Our method can also uses other clustering algorithms, e.g., k-means clustering and hierarchical clustering.

For each pixel, we weight values in the distance map values with respect to a distance between the pixel and a location of the corresponding object kernel in a previous frame. This transformation assigns higher likelihoods to locations closer to the previous location of the object.

Next, we find the peaks within the distance map. We assign the center-of-mass of the region of the object in the previous frame as an additional peak. We merge the peaks that are close to each other using a possible object size parameter. We assign a kernel to each peak if the magnitude of the peak is higher than a predetermined threshold. Therefore, there is at least one peak, and depending on the amount of motion observed in the scene, there may be multiple peaks for each moving object.

Alternatively, we select the initial set of possible kernel locations based on a pathway likelihood map that maintains a history of previously tracked objects. We increase the value of a pixel in the pathway likelihood map if the object kernel corresponds to the pixel. We keep updating the pathway likelihood map for each frame in the video. Thus, after objects have been tracked in a large number of frames, the pathway likelihood map indicates likely locations of objects.

For instance, for a traffic surveillance video, the likelihood pathway map has higher values for the pixels corresponding to the traffic lanes where objects, e.g., vehicles, are moving.

Using the pathway likelihood map, we select a set of pixels based on the pathway likelihood score. For this set of pixels, we determine similarity scores between the object model and the kernels that are centered around these pixels. We scale the similarity scores with the distance from the original kernel location such that the similarity score becomes smaller for pixels farther away from the center. Then, we select recursively the pixels by starting from the pixel that has a maximum score, until a maximum kernel number is achieved or no possible kernel locations remain, by removing a region proportional to the object size at each iteration. These pixels are assigned as the locations of the multiple kernel.

Object Model Management

Object management 250 is performed as follows. An object model is deleted from the object database when the object model does not match with any connected component in subsequent frames. New object models are initialized for connected components that do not match any previously tracked object.

If a currently tracked object is not merged with another one, a scale of the object is adapted 260 using Equation (12), as described below.

Our objects are represented by a non-parametric model. The object model is a (W×H)×D matrix of elements. The elements of the matrix are 3D samples of the color, e.g., RGB pixel intensities, of the object, where W and H are the width and height of the object model respectively and D is the depth or temporal size, measured in terms of successive frames. Note, the model does not include background pixels.

A likelihood of the location of the moving object in the current frame is $z_1$. We refer to the pixels inside the estimated object kernel as $(x_i, u_i)^N_{i=1}$, where $x_i$ is the 2D coordinate in the frame coordinate system and $u_i$ is the 3D color vector.

Corresponding sample points in the object model are represented as $(y_j, v_{jk})^M_{j=1}$, where $y_j$ is the 2D coordinate in the object model coordinate system and $v_{jk}$ is the 3D color vector $\{v_{jk}\}_{k=1,\ldots,D}$.

An index i inside the estimated object kernel maps to the index j in the object model. This mapping is not one-to-one. Usually, the size of the object kernel is much larger than the size of the object model, so one pixel in the object model maps to several pixels inside the object kernel.

During tracking, we maintain 270 each object model by updating an 'oldest' sample of each pixel of the object model with one corresponding pixel from the current frame. We do not use the mean of corresponding pixels to prevent blurring. Using foreground segmentation, pixels in the object model, which correspond to background pixels in the current frame, are not updated.

Mean-Shift with Background Information

A color histogram based mean-shift process can be efficient and robust for non-rigid object tracking. However, if the color information of the tracked object is similar to the color of the background, the performance of the mean-shift tracking is reduced.

Therefore, we also use the background models 211 of the pixels to improve the performance of our mean-shift object tracker 160.

A weighted color histogram of the object is $\{q_s\}_{s=1,\ldots,m}$. The histogram is constructed using the non-parametric object model where a size $h_t$ is half of the horizontal and vertical size of the object model, $$q_s = Q_1 \sum_{j=1}^{M} \sum_{k=1}^{D} k_N\left(\left\|\frac{y_j}{h_t}\right\|^2\right) \delta(\hat{m}(v_{jk}) - s) \quad (1)$$

where a size $h_t$ is half of the horizontal and vertical size of the object model, and $k_N$ is the object kernel weighted according to a multivariate Gaussian (normal) function:

$$k_N(x^*) = (2\pi)^{-d/2} e^{-1/2 x^*} \quad (2)$$

for d dimensional space. We use d equal to two for spatial information, and d equal to three for color information. The constant term $Q_1$ ensures that $$\sum_{s=1}^{m} q_s = 1.$$

The function $\hat{m}$ maps a color value to the corresponding histogram bin in quantized color space.

The object model includes history information. The history information makes the histogram more accurate while the object is occluded.

The color histogram of a kernel centered at location z is $p(z)$. The background color histogram at the same location is $b(z)$. A 2D Gaussian shaped weighting function is used to assign smaller weights to pixels farther away from the center of the kernel.

The Bhattacharya coefficient $$\rho(p(z), q) = \sum_{s=1}^{m} \sqrt{q_s p_s(z)}$$

measures a similarity 221 between the object histogram and the histogram at an expected location z of the object in the current frame.

We integrate the background information and define a similarity function as:

$$\eta(z) = \alpha_f \rho(p(z), q) - \alpha_b \rho(p(z), b(z)) \quad (3)$$

where $\alpha_f$ and $\alpha_b$ are mixing coefficients for the foreground and background components.

Besides maximizing the above similarity function, we penalize the similarity among the current and background histograms. It is assumed that the object has a different appearance than the background.

We use $\alpha_f = 1$ and $\alpha_b = \frac{1}{2}$. The similarity function can be rewritten as:

$$\eta(z) = \sum_{s=1}^{m} \sqrt{p_s(z)} \left(\alpha_f \sqrt{q_s} - \alpha_b \sqrt{b_s(z)}\right) \quad (4)$$

The initial location where we start search for location of the object in the current frame is $z_0$. Using Taylor expansion around the values of the kernel histogram $p_s(z_0)$ and background histogram $b_s(z_0)$ $$\eta(z) \approx \sum_{s=1}^{m} \sqrt{p_s(z_0)} \left(\alpha_f \sqrt{q_s} - \alpha_b \sqrt{b_s(z_0)}\right) + \quad (5)$$

$$\sum_{s=1}^{m} \frac{\alpha_f \sqrt{q_s} - \alpha_b \sqrt{b_s(z_0)}}{2\sqrt{p_s(z_0)}} (p(z) - p(z_0)) -$$

$$\sum_{s=1}^{m} \frac{\alpha_b \sqrt{p_s(z_0)}}{2\sqrt{b_s(z_0)}} (b(z) - b(z_0)).$$

Putting constant terms inside $Q_2$, we obtain $$\eta(z) \approx Q_2 + \sum_{s=1}^{m} \frac{\alpha_f \sqrt{q_s} - \alpha_b \sqrt{b_s(z_0)}}{2\sqrt{p_s(z_0)}} p(z) - \sum_{s=1}^{m} \frac{\alpha_b \sqrt{p_s(z_0)}}{2\sqrt{b_s(z_0)}} b(z). \quad (6)$$

Using definition of the kernel and background histograms $p(z)$ and $b(z)$, the similarity function is rewritten as:

$$\eta(z) \approx Q_2 + Q_3 \sum_{i=1}^{N} w_i k_N\left(\left\|\frac{z - x_i}{h}\right\|^2\right) \quad (7)$$

$$w_i = \sum_{s=1}^{m} \frac{\alpha_f \sqrt{q_s} - \alpha_b \sqrt{b_s(z_0)}}{2\sqrt{p_s(z_0)}} \delta[\hat{m}_f(x_i) - s] - \quad (8)$$

$$\sum_{s=1}^{m} \frac{\alpha_b \sqrt{p_s(z_0)}}{2\sqrt{b_s(z_0)}} \delta[\hat{m}_b(x_i) - s].$$

where $\hat{m}_f(x_i)$ and $\hat{m}_b(x_i)$ map a pixel in the current frame and the background models, to the corresponding color bin in quantized color space.

The size h is equal to the half size of the kernel along each dimension. The second term in Equation (7) is equal to the kernel density estimation with data weighted by $w_i$. The weights $w_i$ can be negative. The mode of this distribution, according to the similarity function of Equation (3), is determined by the mean-shift process.

The mean-shift vector at the location $z_0$ becomes:

$$m(z_0) = \frac{\sum_{i=1}^{n} (x_i - z_0) w_i g_N\left(\left\|\frac{z_0 - x_i}{h}\right\|^2\right)}{\sum_{i=1}^{n} w_i g_N\left(\left\|\frac{z_0 - x_i}{h}\right\|^2\right)}. \quad (9)$$

where $g_N(x^*) = -k'_N(x^*)$.

Object Model Likelihood

The likelihood 281 that a single pixel $(x_i, u_i)$ inside the kernel centered at z belongs to the object can be estimated with Parzen window estimator:

$$l_j(u_i) = \frac{1}{Dh_c^3} \sum_{k=1}^{D} k_N \left( \left\| \frac{u_i - v_{jk}}{h_c} \right\|^2 \right). \quad (10)$$

Above, the size of the kernel that represents the color information is selected as $h_c=16$. The likelihood 281 of an object being at location z is measured as:

$$L(z) = \frac{1}{N} \sum_{i=1}^{N} l_j(u_i) k_N \left( \left\| \frac{x_i - z}{h} \right\|^2 \right). \quad (11)$$

The weighting function for the object kernel $k_N$ assigns smaller weights to samples farther from the center to improve the performance of the estimation.

Pseudo code for the mean-shift tracking method according to the invention is given in Appendix A.

Scale Adaptation

The scale adaptation 260 of the object models is performed using only the foreground pixels. This is done because objects can be moving towards or away from the camera, which changes the size of the objects in the frames. The object kernel of the object centered at an estimated location $z_1$ is B. Centered on the object kernel, is also the outer kernel O. The outer kernel has twice an area of the object kernel B. We maximize a fitness score $$S = \sum_{X \in B} \hat{C}(x) + \sum_{X \in O-B} (1 - \hat{C}(x)) \quad (12)$$

where $\hat{C}(x)$ is one when x is a foreground pixel, and zero otherwise. At each frame, leaving the outer kernel O fixed, we modify the object kernel B in all dimensions in a limit by changing the position of the borderlines, and select a scale, which yields a maximum fitness score.

The dimensions of the rectangular object kernel B are (xL, xR, yU, yD) where xL is the x-coordinate of the leftmost borderline, xR is the rightmost borderline, yU is the upper borderline, and yD is the lower borderline. We change the dimensions within a limit proportional to the frame-rate fr as:

$xL=xL\pm(k*fr*(xR-xL))$, $xR=xR\pm(k*fr*(xR-xL))$, $yU=yU\pm(k*fr*(yD-yU))$, $yD=yD\pm(k*fr*(yD-yU))$, and determine the fitness score each time.

Usually, because of the low frame rate, there is no overlap in object kernels in two consecutive frames, that makes it impossible to track the objects with a conventional mean-shift process. Our object model likelihood function is very effective in resolving ambiguities caused by multiple objects in the scene. Moreover, the histogram based mean-shift tracker can be improved significantly by including the background models 211.

Fusion of the Kernel Estimates

After we initialize multiple kernels for an object and apply the mean-shift estimation to each kernel, we obtain estimated kernel locations $(x, y)^k$. where k=1, ... , K, and K is the number of multiple kernels. Then, we fuse these location estimations to determine the new location $(x, y)^*$ of the object, as follows.

There are several likelihood scores that we can assign to each of these estimated locations. We measure a distance likelihood score by measuring the distance between the estimated location of the kernel and the previous location $(x, y)_{t-1}$ of the object. The distance likelihood score is lower for larger distances. The distance can be measured either by using the 2D image plane distance or the 3D ground plane distance, if a ground plane of the scene is available.

We integrate motion history of the object by determining and assigning a motion likelihood score based on the previous speed and direction of the object within the previous frames using a Kalman filter. The motion likelihood score has lower values if the estimated location of the kernel according to the mean-shift method is further away from the estimated location according to the Kalman filter.

Because we already have an object model, we also determine a model likelihood score by comparing the object model with the kernel centered at the estimated location of the object in the current frame. The model likelihood distance includes color, gradient, orientation, and texture distances. For comparison, we determine a similarity between the object model and the current frame color, gradient, and texture features. We assign higher model likelihood scores if the object model has higher values. The above likelihoods are determined for each of the estimated locations of the multiple kernels.

We determine a fusion score for each kernel to combine all these scores. We sum the weighted distance, motion, and model likelihood scores.

To determine a new location of the object, two methods are possible. A first method selects the location with the highest score as the estimated location of object in the current frame.

A second method is based on vector addition. We set the previous location $(x, y)_{t-1}$ of the object as an origin (0,0), and we determine difference vectors with respect to the origin by subtracting the previous location $(x, y)_{t-1}$ from the estimated kernel locations $(x, y)_k$, i.e., $(x, y)_{kd} = (x_k - x_{t-1}, y_k - y_{t-1})$. We multiply each of the difference vectors by their fusion score. Then, we determine the vector sum and normalize the vector sum with respect to the total of the fusion weights. The result gives the difference between the previous and the new location of the object.

Effect of the Invention

The invention provides a method for tracking objects in a video acquired at a low frame rate. Multiple mean-shift processes are iterated over multiple kernels centered around high motion areas obtained by the change detection.

Unlike conventional methods, the method according to the invention can track moving objects at lower temporal resolutions, e.g., one fps, without sacrificing robustness and accuracy.

The multi-kernel method can also track multiple objects concurrently. The method also works well in the presence of occlusions, e.g., when the object temporarily 'disappears' behind a tree, or parked vehicle.

The multi-kernel method also has a better performance than conventional methods when the video is processed at the full temporal resolution.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for tracking a moving object in a video acquired of a scene with a camera, comprising the steps of:
acquiring a video of a scene, the video including a sequence of frames, each frame including a plurality of pixels, and for each frame, further comprising the steps of:
maintaining a background model;
detecting a moving object according to the background model;
maintaining an object model for the moving object, in which the object model is a (W×H)×D matrix of elements, each element including color samples, where W and H are a width and height of the object model respectively, and D is a depth measured in terms of successive frames;
assigning, to the moving object, a plurality of kernels according to a likelihood of a pathway of the moving object and a likelihood of the object model;
applying, to each kernel, a mean-shift process to estimate a location of the kernel, in which the estimated location of the moving object in a current frame is $z_1$, and pixels inside the object kernel are $(x_i, u_i)^N_{i=1}$, where $x_i$ is a 2D coordinate in a frame coordinate system and $u_i$ is a feature vector including color and perpendicular gradient magnitudes of pixels, and sample points in the object model are represented as $(y_j, v_{jk})^M_{j=1}$, where $y_j$ are the 2D coordinates in an object model coordinate system and $v_{jk}$ is a feature vector $\{v_{jk}\}_{k=1,\ldots,D+2}$ for 2D colors and gradient magnitudes;
combining the estimated locations of the plurality of kernels; and
determining an estimated location of the moving object according to the combined estimated locations of the plurality of shift kernels to track the moving object in the video.

2. The method of claim 1, further comprising the steps of:
acquiring a plurality of videos with a plurality of cameras;
detecting concurrently a plurality of moving objects in the plurality of videos; and
tracking concurrently the plurality of moving objects in the plurality of videos.

3. The method of claim 1, further comprising the step of: sub-sampling the plurality of frames.

4. The method of claim 1, in which the video is acquired at a low-frame rate.

5. The method of claim 1, in which the frames are acquired at a rate less than two frames per second.

6. The method of claim 1, further comprising the step of: removing unconnected pixels to detect the moving object.

7. The method of claim 1, in which the plurality of kernels include an object kernel enclosing all the pixels associated with the moving object, an inner kernel including 90% of the pixels of the moving object, and an outer kernel twice an area size of the object kernel.

8. The method of claim 7, in which each kernel is rectangular.

9. The method of claim 7, in which each kernel is a circular area.

10. The method of claim 7, in which each kernel is a shape of the moving object in the previous frame.

11. The method of claim 1, in which the plurality of kernels are moved in a direction of gradients of pixel intensities.

12. The method of claim 1, in which each kernel is weighted according to a Gaussian function.

13. The method of claim 1, in which each kernel is represented by a color histogram.

14. The method of claim 1, in which the likelihood is determined using a Parzen window estimator.

15. The method of claim 1, further comprising the steps of: scaling a size of the moving object.

16. The method of claim 1, further comprising the steps of:
aggregating previous locations of the kernels; and
normalizing the aggregated locations to obtain a likelihood of the pathway of the moving object.

17. The method of claim 1, further comprising the steps of:
determining a distance map between the background model and the frame;
weighting, for each pixel in the frame, a value in the distance map according to a distance between the pixel and a previous location of the kernel;
finding peaks in the distance map;
assigning a previous location of the moving object as one of the peaks;
merging peaks near each other;
thresholding the merged peaks with respect to magnitudes of the peaks; and
centering one of the plurality of kernel centered on each peak.

18. The method of claim 17, further comprising the step of:
clustering the pixels with respect to the distance map.

19. The method of claim 18, further comprising the step of:
applying a spatial mean-shift segmentation using a size of the moving object.

20. The method of claim 1, further comprising the steps of:
selecting an initial set of possible kernel locations;
determining a similarity score between object model and the kernels that are centered around the locations within the initial set;
assigning each location a weight that is inversely proportional to a distance from the initial kernel location;
multiplying the similarity score by the weight to determine a peak likelihood; and
recursively selecting the multiple kernel locations by starting from the possible location that has a maximum peak likelihood score by removing a region proportional to the object size at each iteration until a maximum kernel number is achieved or no possible kernel locations remain.

21. The method of claim 20, further comprising the step of:
selecting the initial set of possible kernel locations based on a pathway likelihood map.

22. The method of claim 1, further comprising the step of:
determining a number of the plurality kernels according to a frame rate at which the video is acquired.

23. The method of claim 7, further comprising the steps of:
modifying dimensions of the object kernel within a range of values proportional to a frame-rate at which the video was acquired.

24. The method of claim 1, in which the background model is based on gradient magnitudes, orientations, and texture features of the pixels.

25. The method of claim 1, further comprising for each kernel the steps of:
determining a distance likelihood score by measuring a distance between an estimated location of the kernel and a previous location of the kernel;
determining a motion likelihood score based on a previous speed and direction of the moving object in previous frames;

determining a model likelihood score by comparing the object model to a color, a gradient, an orientation and a texture at the estimated location of the kernel;

determining a fusion score by aggregating a weighted sum of the distance, motion, and model likelihoods; and assigning a new location of the moving object in the current frame using the fusion score.

26. The method of claim 25, further comprising the steps of:

determining a maximum fusion score of the plurality of kernels; and assigning the new location of the moving object according to the maximum fusion score.

27. The method of claim 25, further comprising the step of:

constructing, for each kernel, a difference vector between the estimated location of the kernel and the previous location of the moving object;

multiplying the difference vectors by the fusion scores;

determining a sum vector that is a sum of the multiplied difference vectors;

normalizing the sum vector; and assigning the normalized vector as a difference between the new and previous locations of the moving object.

* * * * *